United States Patent [19]
Inoue et al.

[11] Patent Number: 5,554,455
[45] Date of Patent: Sep. 10, 1996

[54] RESEALABLE SAFETY VENT AND A SEALED ALKALINE RECHARGEABLE BATTERY PROVIDED WITH THE SAFETY VENT

[75] Inventors: Hiroshi Inoue, Neyagawa; Shinji Hamada, Hirakata; Hiromu Matsuda, Hyogo; Munehisa Ikoma, Tawarahonmachi; Hiroshi Yamasaki, Katano, all of Japan

[73] Assignee: Matsushita Electric Industrial Co., Ltd., Osaka, Japan

[21] Appl. No.: 502,280

[22] Filed: Jul. 13, 1995

[30] Foreign Application Priority Data

Jul. 13, 1994 [JP] Japan .................................. 6-161188

[51] Int. Cl.⁶ .................................................... H01M 2/12
[52] U.S. Cl. .................................................... 429/53; 429/54
[58] Field of Search ........................................ 429/53, 54

[56] References Cited

U.S. PATENT DOCUMENTS

| | | | |
|---|---|---|---|
| 3,436,273 | 4/1969 | Gratzmuller | 429/54 |
| 4,078,121 | 3/1978 | Gratzmuller | 429/54 |
| 5,258,242 | 11/1993 | Dean et al. | 429/54 |
| 5,407,760 | 4/1995 | Kasner et al. | 429/54 |

FOREIGN PATENT DOCUMENTS

| | | |
|---|---|---|
| 474196 | 5/1975 | Australia . |
| 898194 | 4/1945 | France . |
| 1764553 | 8/1971 | Germany . |
| 8534913 | 2/1986 | Germany . |
| 9312173 | 10/1993 | Germany . |
| 1-93051 | 4/1989 | Japan . |
| 2156574 | 10/1985 | United Kingdom . |

*Primary Examiner*—Hoa Van Le
*Attorney, Agent, or Firm*—Ratner & Prestia

[57] ABSTRACT

A safety vent body having a passage at the center of the bottom surrounded by a circular protrusion, a safety vent cover having a vent hole bonded to the safety vent body, and an elastic valve component consisting of valve seat and rubber pad bonded together into a one-piece structure and a coil spring, housed in a space provided by the safety vent body and the safety vent cover. A plastic container sealed alkaline rechargeable battery realizes a longer cycle life and high reliability by incorporating a resealable safety vent in accordance with the present invention.

14 Claims, 3 Drawing Sheets

RESEALABLE SAFETY VENT AND A SEALED ALKALINE RECHARGEABLE BATTERY PROVIDED WITH THE SAFETY VENT

BACKGROUND OF THE INVENTION

1. Field of the Invention

The present invention relates to a resealable safety vent for a sealed rechargeable battery having a plastic container and a sealed alkaline battery provided with the same safety valve.

2. Description of the Prior Art

Recently, many systems have been developed which use a rechargeable battery, taking advantage of the economy of repetitive use of the battery. This type of battery is used in portable electric and electronic appliances, electric vehicles and other mobile devices, uninterruptible power systems (UPS) and in many other kinds of power systems used for electrical storage for load leveling, etc. In order to make the power source unit lighter and smaller, the battery systems should have a higher energy density, longer life, higher safety, higher reliability, easier maintenance, higher operational economy and other performance characteristics. Among others, sealing of a battery container, is an indispensable item for alleviating the complexity of maintenance in, for example, liquid replenishment, which is required with the above mentioned performance items. Several technologies have been developed, to seal a battery without causing increase of the inner cell pressure. These include absorption by the negative electrode using the oxygen cycle reaction, the catalyst plug type, the auxiliary electrode and others. Among these technologies, the absorption by negative electrode is popularly used. The sealing of rechargeable batteries by means of absorption by the negative electrode is realized by a construction, where the capacity of the negative electrode is made larger than that of positive electrode. The capacity of the battery is adjusted so that only oxygen gas is generated from the positive electrode during charging, especially in the overcharge region, thus reducing the electrolyte to the lowest possible amount making the electrode group starved. In a battery thus constructed, the oxygen gas generated from the positive electrode during charging is reduced at the negative electrode and vanishes by absorption.

Gas pressure in the battery cell is maintained in equilibrium and the volume of the electrolyte is fixed without diminishing; therefore no replenishment is necessary. However, in many of the sealed rechargeable batteries, a resealable safety vent is provided in preparation for a possible abnormal increase of the internal pressure of the battery cell which could be caused by a reduced gas absorption capability of the negative electrode due to the passage of time or by an excessive charging current caused by a malfunction in a power supply device used for charging the battery. The resealable safety vent normally keeps a container sealed closing the inside of a battery cell from the ambient air, while permitting discharge of excessive gas generated within a battery cell under unusual conditions and seals again after the excess gas is discharged outside the cell.

Among the sealed rechargeable batteries, a rechargeable battery using an alkaline electrolyte in a nickel-cadmium system or nickel-metal hydride system where caustic alkali of the electrolyte consists mainly of potassium hydroxide does not directly participate in the charge (discharge electrochemical reactions) is preferred to a conventional lead-acid rechargeable battery system where sulfuric acid electrolyte also reacts. The alkaline battery has higher energy density, longer life and higher reliability and is being used more frequently.

In most of the small size sealed alkaline rechargeable batteries, a steel cell can is sealed at its top edge with a steel disk having a unitized polyamide gasket around its circumference. In the rechargeable batteries for use in an electric vehicle or electric storage, where by the nature of the application a large capacity, hence a large size is needed, a commonly used configuration for attaining safety and lightweight characteristics is that an electrode group consisting of a plurality of positive and negative plates with a separator in between and housed in a generally square or rectangular shaped alkali-resistive plastic container.

Representative examples of prior art resealable safety vents or valves for sealed alkaline rechargeable battery are described in the following discussion.

(1) A small size sealed alkaline nickel-cadmium rechargeable battery consisting of a steel cell container is a representative product of this category. Production of this type battery is the largest right now. This type of battery is described in the gazette of patent publications Japan, Jitsu-Kai Sho58-10146. As illustrated in FIG. 3, the battery is sealed with a configuration where a steel disc cover 34 having a through hole 32 at the centre surrounded by a circular extrusion 33 is welded to a steel cap 35 having a vent hole 37 which acts as the positive electrode. The through hole 32 is hermetically sealed by an elastic valve body 31 of synthetic rubber which is inserted between the steel disc cover 34 and the steel cap 35 in contact with the circular extrusion 33 cut into the elastic valve body 31. Normally, the top edge of a can 36, which houses an electrode group 39 made up of a positive and a negative plates with a separator in between, wound and soaked with electrolyte, is bent or crimped to be sealed with the cover 34 by placing a gasket 38 in between. If the pressure within the cell goes unusually high the high pressure gas pushes up the elastic valve body 31 placed on the through hole 32, and escapes through the vent hole 37. When the pressure within cell decrease the through hole 32 is closed again by the elastic valve body 31, and the cell is isolated from the ambient.

(2) A sealed alkaline rechargeable battery using a nickel metal hydride system or others comprising a plastic container, being the same type of battery as the present invention, is described below U.S. Pat. No. 5,258,242 being an example. One of embodiments of the U.S. patent is shown in FIG. 4. In FIG. 4, a resealable safety valve 40 has the construction where a safety valve body portion 41 having a through hole 41a at its bottom is screwed and attached to a safety valve cover 42 for example by threads as shown in the drawing, having a vent hole 42a. A space or passage 40a is thus created inside said safety valve 40 said space including means to hold a valve seat 44 having an axial part 44a inserted inside of a coil spring 43. An O-ring 45 made of synthetic rubber is disposed in a groove 44b in valve body portion 41.

The through hole 41a of safety valve body portion 41 is closed by the O-ring 45 which is pressed to the inner surface of the safety valve body 41 by the action of the coil spring 43. Attaching the resealable safety valve 40 to a battery container cell, seals and isolates the cell from ambient atmosphere. If the gas pressure within a cell goes higher than the specified operating pressure of the safety valve the excesss gas pressure pushes up the valve seat 44 and the O-ring 45 positioned on the through hole 41a of the safety valve body portion 41 and escapes through the vent hole 42a of the safety valve cover 42, via the space 40a. When the cell pressure decreases, the sealed condition is restored. Although in the above embodiment, an O-ring is used to keep the battery sealed, a synthetic rubber sheet may be used in place of the O-ring. Other structures where a safety valve body and cover of an electrolyte container are unitized or a safety valve is screwed onto a battery container and others have been put into service.

A number of problems remained unsolved, with resealable safety vents used for sealed alkaline rechargeable batteries having a plastic container: Improvement of this type of battery is needed for use as a power source for electric vehicles and other mobile devices.

The resealable safety vent illustrated in FIG. 3 is suitable, as already described, for a sealed alkaline rechargeable battery which employs a small steel cell container and has a high operating pressure (higher than 10 kgf/cm$^2$) for the safety vent. For a sealed alkaline rechargeable battery with plastic container where the operating pressure of the safety vent needs to be low, however, the resealable safety vent as illustrated in FIG. 3 does not work. If the safety vent is set at a lower operating pressure with the construction remaining as it is, spread of the operating pressures is large, and the reliability deteriorates.

A resealable safety vent having a structure as illustrated in FIG. 4 is intrinsically applicable to a plastic container sealed alkaline rechargeable battery. However, when it is used in a power source for a moving apparatus such as an electric vehicle, the safety vent cover 42 becomes loose from being screwed to the safety valve body 41 because of external forces such as vibration, shock, acceleration, etc. and the operating pressure of the safety valve gradually tends to shift to a lower value.

Under such conditions, as the time the battery is in service increases and the charge-discharge cycles are repeated the vent operating pressure decreases further, and the gas generated during charging is discharged out of the cell before the electrical charge has reached a specified level, the quantity of electrolyte decreases and the internal resistance of the battery increases. The increased internal resistance results in an increased cell voltage during charging which can cause insufficient charging. Also lowered cell voltage during discharge causes deteriorated capacity and cycle life. Another problem intrinsic to a construction where a safety vent cover is fixed to a safety vent body by a threaded connection is that the safety vent cover might be unscrewed and loosened by a casual mistake of a user causing a change in the operating pressure of the safety vent resulting in the vent being unable to guarantee the operational reliability. Furthermore, in a sealed alkaline rechargeable battery where a resealable safety valve is made of parts screwed together and fixed to a cover of an electrolyte container, the adverse influence of external forces such as vibration, shock, etc. is significant and the reliability deteriorates further.

SUMMARY OF THE INVENTION

A resealable, safety vent comprising a safety vent body having a passage at the center of the bottom surrounded by a circular protrusion, a safety vent cover having a vent hole bonded to the safety vent body, and an elastic valve component consisting of valve seat and rubber pad bonded together into a one-piece structure and a coil spring, housed in a space provided by the safety vent body and the safety vent cover. A plastic container sealed alkaline rechargeable battery realizes a longer cycle life and high reliability by incorporating a resealable safety vent in accordance with the present invention.

The present invention provides a hermetically resealable safety vent that provides a stable vent operating pressure and a high operational reliability in a sealed alkaline rechargeable battery having a plastic battery cell container for use as power source for mobile devices like electric vehicles, etc.

The present invention also provides a sealed alkaline rechargeable battery that provides a stable charge-discharge characteristic and a long cycle life even when it is used as power source for a mobile apparatus by virtue of the fact that the battery is equipped with a resealable safety vent in accordance with the present invention.

IV BRIEF DESCRIPTION OF THE DRAWING

DETAILED DESCRIPTION OF THE INVENTION

The present invention is a resealable safety vent comprising a safety vent body having a through hole or passage at the center of the bottom surrounded by a circular extrusion or flange and a safety valve cover having a vent hole, fastened to the valve body by means of bonding or fusion bonding, and an elastic valve component consisting of a valve seat and rubber pad fabricated into one-piece, the upper part of the value component being inserted into a coil spring, the elastic valve component being housed in an internal base provided in the safety vent body and safety vent cover. The coil spring is compressed between the top surface of the valve seat flange and the safety vent cover; wherein the bottom surface of rubber pad of said elastic valve component is pressed down on a circular extrusion in the safety vent body to close the through hole or passage in the bottom of the safety vent body.

Furthermore, the present invention solves the hitherto technical problems of prior art sealed alkaline rechargeable batteries by employing a plastic container equipped with a resealable safety vent having a construction according to the invention.

Details of the present invention are described by the following examples considered with the drawings and Tables.

EXAMPLES

Example 1

Figure 1:
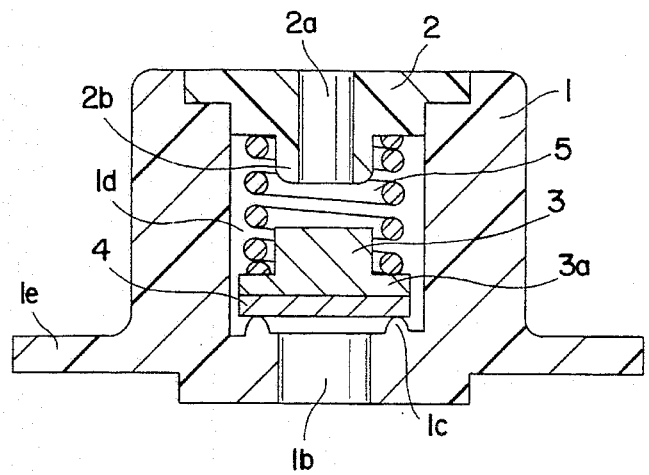
FIG. 1 is a longitudinal sectional view of a resealable safety vent for a sealed rechargeable battery in accordance with the present invention.

FIG. 1 is a longitudinal sectional view of a resealable safety vent for a sealed rechargeable battery in accordance with the present invention. In FIG. 1, a safety vent body 1 has at the center of its bottom surface a passage (through hole) 1b surrounded by a circular protrusion 1c. A unitary valve component consisting of a valve seat 3 and a rubber pad 4 attached to the flat bottom surface of flange 3a on a valve seat 3 is disposed inside the inner space or passage 1d of safety vent body 1. The rubber pad 4 must be placed on the bottom surface of safety vent body 3 to contact circular protrusion 1c. A coil spring 5 is placed over the upper portion of the valve seat and rests on flange 3a. The bottom extrusion 2b of safety vent cover 2 a vent hole 2a is inserted into the top part of the coil spring 5. The safety vent cover 2 compresses the coil spring 5 so that the safety vent cover 2 when fixed to the top of the internal passage of the safety vent body 1 by bonding or fusion bonding results in a unitary structure. Thus a resealable safety vent in accordance with the present invention is fabricated. In this construction, the bottom surface of rubber pad 4 is pressed onto the circular protrusion 1c of safety vent body 1 thus closing the passage 1b. The safety vent body 1 has an internal cylindrical shape, and the safety vent cover 2, valve seat 3 and rubber pad 4 are of generally cylindrical shape.

The components of a resealable safety vent in accordance with the present invention, viz. the safety vent body 1, the safety vent cover 2, a valve component consisting of the valve seat 3 and rubber pad 4, and the coil spring 5 are aligned with their center lines on the same axis. ABS resin (acrylonitrile-butadiene-styrene terpolymer) is used as the material for the safety vent body 1, the safety vent cover 2 and the valve seat 3. The diameter of the valve seat flange 3a, housed in the safety vent body 1, is smaller than inner diameter of the safety vent body 1. The diameter of the rubber pad 4 which is to be bonded to the valve seat flange having a flat bottom surface is made equal to or slightly smaller than diameter of the valve seat flange 3a. The rubber pad 4 used to fabricate a valve according to the invention is made in the form of a disk 1.0 mm thick having a 75 degree Shore hardness, from EPT (ethylene-propylene-diene terpolymer) rubber. The coil spring 5 is made from a stainless steel wire material, the free length of which is 8.75 mm, and the spring constant 0.8 kgf/mm. Outer diameter of the coil spring 5 is made smaller than inner diameter of the safety vent body 1. The inner diameter of the spring 5 is made larger than outer diameter of the top part of valve seat 3. The parts are designed and fabricated so that an elastic valve component consisting of the unitized valve component made of the valve seat 3 and the rubber pad 4, and the coil spring 5 can move up and down smoothly within the safety vent body 1. The safety vent body 1 and the safety vent cover 2 may be made into a unitary structure by means of bonding, however, the ultrasonic fusion bonding method is recommened in view of its higher working efficiency.

Figure 5:
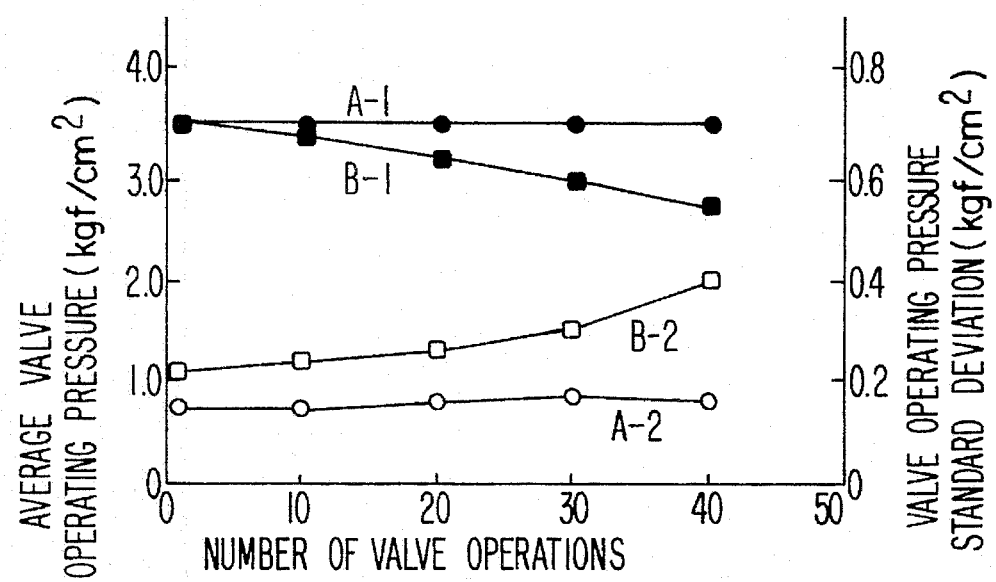
FIG. 5 is a plot of the number of repetitive valve operations against the average value and standard deviation value of valve operating pressure in the resealable safety vent.

One hundred samples (A) of a resealable safety vent in accordance with the present invention with the operating pressure set at 3.5+0.5 kgf/cm$^2$ (A) and one hundred samples (B) of a similar resealable safety vent except that the safety vent body 1 and the safety vent cover 2 are fastened together by means of complimentary threaded sections screwed together have been prepared for comparative study. The operating pressure of the B samples was set at the same value as the A samples. These sample vents were fusion bonded at their flange part 1e to the cover of an ABS resin-made cell container to make sample batteries for comparison. The comparative test was conducted with high pressure nitrogen gas from a cylinder fed inside of the cell container to repeatedly activate or work the safety vent. In FIG.5, the average value of the valve operating pressure and valve operating pressure standard deviation are plotted against the number of safety vent operations for the comparative samples. Among the comparative samples, the average operating pressure B-1 clearance and the standard deviation value B-2 increases along with repetitive operation of the valve (FIG.5). Examining the test safety vents where the safety vent operating pressure became low revealed these vents were fabricated by screwing the safety vent cover to the safety vent body and the parts had become loose. This loosening seems to have been caused by vibration. The safety vent cover had been screwed to the safety vent body with a torque wrench to adjust the vent operating pressure, however it was difficult to adjust the operating pressure with a high degree of accuracy. Because of this, the standard deviation value of valve operation pressure of these samples was large from the beginning. Meanwhile, it was observed that the resealable safety vent in accordance with the present invention wherein the safety vent body and the safety vent cover are fastened into a unitary structure by bonding show the least change in the average value of valve operating pressure A-1 and the standard deviation value A-2 even after undergoing a number of repetitive valve operations. Thus safety vents according to the invention show high operational reliability.

A comparative sample (C) of resealable safety vents having the same structure as the valve (A) in accordance with the present invention was prepared except that the form of the safety vent body 1 and the valve seat 3 are square cylinders.

Furthermore, as a comparative sample (D) resealable safety vents having the same structure as the valve (A) in accordance with the present invention were prepared except that the axes of the circular extrusion 1c, the safety vent cover 2, the valve seat 3, the rubber pad 4 and the coil spring 5 do not coincide with the axis of the internal space 1d.

One hundred samples each of the safety vent (A) in accordance with the present invention, and the valve (B) and (C) were prepared, These resealable safety vents having (A), (B) and (C) structures were set at an operating pressure of 3.5±0.5 kgf/cm$^2$, and underwent repeated cycles of the valve operating pressure. The valve operating pressure was achieved by feeding nitrogen gas to the passage 1b closed by the valve component 3 to exert pressure on the bottom surface of the sealing material 4. The nitrogen gas pressure is raised, and when a gas pressure higher than 0.1 kgf/cm$^2$ is detected at the vent hole 2a the valve is judged to have operated, and the nitrogen gas pressure at that moment is recorded as the valve operating pressure. After repeating this test, the average valve operating pressure and the standard deviation value were calculated for each of the samples (A), (B) and (C). The results are shown in FIG. 6.

Figure 6:
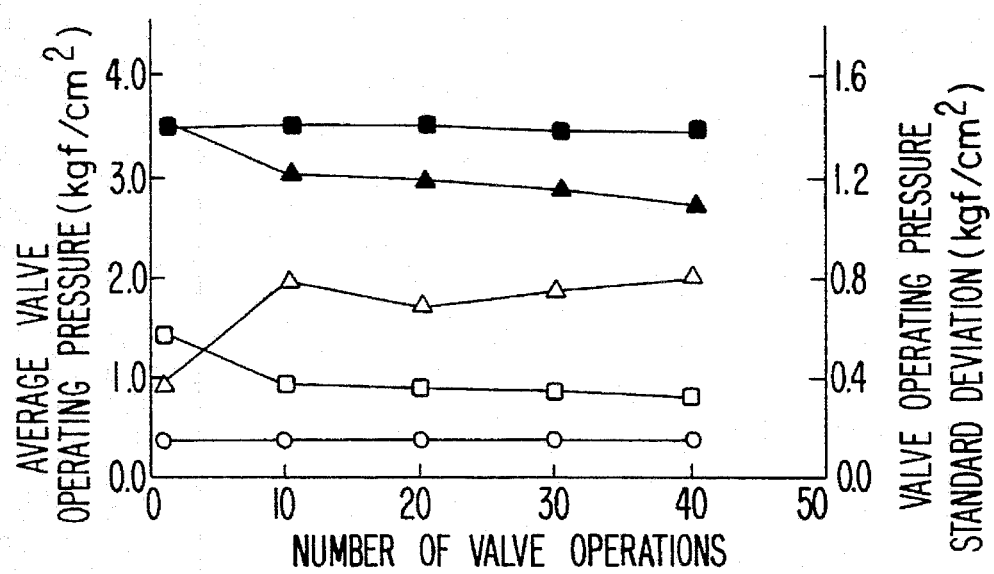
FIG. 6 is a plot of the number of valve operations against the average value and standard deviation value of valve operating pressure in the resealable safety vent.

As shown in FIG. 6, the resealable safety vent samples (B) do not show an increase of the standard deviation of the valve operating pressure caused by repetitive valve operation. However, the square cyndrical shape of the internal space 1d and the valve seat 3 tends to cause concentration of the friction at four corners of both when the side-wall of the internal space 1d and the valve seat 3 touch each other during valve operation. Because of this, the smooth up and down motion of the valve seat 3 within the internal space 1d is blocked; hence, the standard deviation value of the valve operating pressure, especially during the first valve operation, is large as compared with safety vent samples A.

The resealable safety vent sample (D) shows a decreasing average value of the valve operating pressure along with the repetitive valve operation, and an increase in the standard deviation value. Because of a structure where the axes of the safety vent cover 2, the valve seat 3, rubber pad 4 and the coil spring 5 are not on the longitudinal axis of the internal space 1d, the safety vent cover 2, the valve seat 3, the rubber pad 4 and the coil spring 5 can not return to its original position after a valve operation. Because of this reason, after repetitive valve operations, especially after the first operation, relative positioning among the safety vent cover 2, the valve seat 3, the rubber pad 4 and the coil spring 5 are significantly displaced; causing a large standard deviation value of the valve during early stages of operation. Thereafter, along with repetitive valve operation, the displacement of the relative positions among the safety vent cover 2, the valve seat 3, the rubber pad 4 and the coil spring 5 gradually increases, and the average valve operating pressure decreases, the vent operating pressure does not become stable and the standard deviation of the vent operating pressure increases.

In contrast to the above mentioned results, the resealable safety vent samples (A) in accordance with the present invention, whose internal space 1d and the valve seat 3 have a cylindrical shape and the axes of the safety vent cover 2, the valve seat 3, the rubber pad 4 and the coil spring 5 are coincident with the longitudinal axis of the internal space or passage 1d, the valve seat 3 moves up and down within the internal space 1d during valve operation, and the axes of the valve seat 3 and the coil spring 5 hardly shift from the axis of the internal space 1d. Therefore, even when the number of repetitive valve operations increases the average value of the valve operating pressure and the standard deviation value are stable.

Example 2

Using the same structure of a resealable safety vent in accordance with the present invention as illustrated in FIG. 1, constituent parts other than the rubber pad 4 are maintained the same as those in the Example 1. The rubber pad 4 is varied in thickness and Shore hardness and the valve operating pressure is measured. The safety vent operating pressure, among other items, is fixed and the spread is compared by the standard deviation value. Furthermore, a sample of a nickel-metal hydride system sealed alkaline rechargeable battery having nominal capacity 100 Ah, referred to in Example 5 below, equipped with the resealable safety vent according to the invention was prepared to be checked to determine whether or not there is any leakage from the vent hole of the safety vent cover after having undergone a temperature cycle test, from −10° C. to +65° C. and from +65° C. to −10° C. in linear transition, for 50 cycles in 24 hrs, under conditions of an ambient atmosphere with a 90% relative humidity. Results are shown in Table 1.

TABLE 1

| Sample No. | Rubber Pad Thickness [mm] | Rubber Pad Hardness [degree] | Vent Operating pressure standard deviation [kgf/cd] | Leakage [%] |
| --- | --- | --- | --- | --- |
| 1 |  | 40 | 0.85 | 100 |
| 2 |  | 50 | 0.37 | 100 |
| 3 | 0.4 | 75 | 0.20 | 100 |
| 4 |  | 100 | 0.19 | 100 |
| 5 |  | 110 | 0.50 | 100 |
| 6 |  | 40 | 0.23 | 100 |
| 7 |  | 50 | 0.16 | 89 |
| 8 | 0.5 | 75 | 0.15 | 69 |
| 9 |  | 100 | 0.13 | 75 |
| 10 |  | 110 | 0.20 | 100 |
| 11 |  | 40 | 0.25 | 98 |
| 12 |  | 50 | 0.16 | 10 |
| 13 | 1.0 | 75 | 0.15 | 5 |
| 14 |  | 100 | 0.14 | 38 |
| 15 |  | 110 | 0.24 | 89 |
| 16 |  | 40 | 0.78 | 20 |
| 17 |  | 50 | 0.26 | 19 |
| 18 | 1.5 | 75 | 0.17 | 79 |
| 19 |  | 100 | 0.16 | 100 |
| 20 |  | 110 | 0.31 | 100 |
| 21 |  | 40 | 1.59 | 10 |
| 22 |  | 50 | 1.37 | 55 |
| 23 | 1.6 | 75 | 0.71 | 100 |
| 24 |  | 100 | 0.69 | 100 |
| 25 |  | 110 | 0.59 | 100 |

As indicated in Table 1, when the rubber pad is 0.4 mm thick, all of the samples leak despite the varied Shore hardness; therefore, no hermetic sealing is achieved. When the rubber pad is 1.6 mm thick, standard deviation value of the valve operating pressure is large; and the operating pressure turns out to be unstable. When the rubber pad thicknesses are 0.5–1.5 mm, the valve operating pressure stays in a relatively stable range; however, with the Shore hardness 40° the hermetic sealing is not achieved, and a high leakage rate occurs. The Shore hardness of 110° also results in a high leakage rate. The valve operates in a stable manner with high reliability when the rubber pad thickness is within a range of 0.5–1.5 mm, and the Shore hardness is within a range of 50°–100°.

Example 3

Using the same structure of a resealable safety vent in accordance with the present invention as illustrated in FIG. 1, constituent parts other than the coil spring 5 are maintained the same as those in Example 1. The coil spring 5 is varied in free length and spring constant, and the valve operating pressure is measured. The spread of valve operating pressure is compared by the standard deviation value. The results are shown in Table 2.

As indicated in Table 2, the spread increases when the free length of the coil spring is 16.0 mm. This seems to have been caused by the free length of coil spring being too long and the coil caused blocking during assembly of the safety vent. A 4.0 mm free length seems to be too short for the coil spring to show an appropriate measure of elasticity, and there is a large spread in valve operating pressure. A range of suitable coil spring lengths is within the range of 5.0–15.0 mm; however, a 0.1 kgf/mm spring constant causes blocking of the coil spring during assembly of the safety valve resulting in a large spread in the valve operating pressure. Through these facts it is confirmed that high reliability in operating pressure of the safety valve is obtainable when the coil spring 5 has a free length within the range 5.0–15.0 mm and a spring constant between 0.2–2.0 kgf/mm.

TABLE 2

| Sample No. | Coil From length [mm] | Spring Constant kgf/mm | Valve operating standard deviation [kgf/cd] |
|---|---|---|---|
| 26 |  | 0.1 | 0.99 |
| 27 |  | 0.2 | 0.98 |
| 28 | 4.0 | 0.8 | 0.72 |
| 29 |  | 2.0 | 0.69 |
| 30 |  | 2.1 | 0.86 |
| 31 |  | 0.1 | 0.56 |
| 32 |  | 0.2 | 0.16 |
| 33 | 5.0 | 0.8 | 0.13 |
| 34 |  | 2.0 | 0.15 |
| 35 |  | 2.1 | 0.38 |
| 36 |  | 0.1 | 0.32 |
| 37 |  | 0.2 | 0.15 |
| 38 | 8.75 | 0.8 | 0.15 |
| 39 |  | 2.0 | 0.18 |
| 40 |  | 2.1 | 0.47 |
| 41 |  | 0.1 | 0.53 |
| 42 |  | 0.2 | 0.19 |
| 43 | 15.0 | 0.8 | 0.19 |
| 44 |  | 2.0 | 0.23 |
| 45 |  | 2.1 | 0.45 |
| 46 |  | 0.1 | 0.78 |
| 47 |  | 0.2 | 0.39 |
| 48 | 16.0 | 0.8 | 0.40 |
| 49 |  | 2.0 | 0.81 |
| 50 |  | 2.1 | 1.09 |

Example 4

Using the same structure of a resealable safety vent in accordance with the present invention as illustrated in FIG. 1, constituent parts other than the safety vent body 1 are maintained the same as those in the Example 1. The circular protrusion 1a of safety vent body 1 is varied in height and the valve operating pressure is measured. Spread of the valve operating pressure is compared by the standard deviation value. Results are shown in Table 3 below.

TABLE 3

| Sample No. | Circular Extrusion Height (mm) | Vent Operating pressure standard deviation [kgf/cd] |
|---|---|---|
| 51 | 0.00 | 1.01 |
| 52 | 0.24 | 0.49 |
| 53 | 0.25 | 0.18 |
| 54 | 0.50 | 0.15 |
| 55 | 2.00 | 0.22 |
| 56 | 2.10 | 0.35 |

From Table 3 it can be determined that when the height of the circular protrusion 1a is within a range 0.25–2.00 mm, operating pressure of the safety vent is stable. The reason seems to be that when the height of protrusion 1a is lower than 0.24 mm the pressure exerted by bottom surface of the rubber pad 4 of valve component on the bottom of the safety vent body 1 turns out to be insufficient; while if the height of extrusion is more than 2.00 mm overall length of the elastic valve component turns out to be too long and the bottom surface of rubber pad does not always fit horizontally on the protrusion.

Example 5

Comparative samples of nickel-metal hydride system sealed alkaline rechargeable batteries having a nominal capacity of 100 Ah equipped with resealable safety vents in accordance with the present invention (A), and the same batteries equipped with resealable safety vents the safety vent cover of which is, in the same way as the comparative samples in Example 1, screwed to the safety vent body (B) were prepared. Five (5) (A) cells and 5 (B) cells, underwent a charge and discharge cycle life test with vibration simulated to approximate a power source of an electric vehicle during discharge. The vent operating pressure is adjusted to be $3.5 \pm 0.5$ kgf/cm$^2$ for both (A) and (B) resealable safety vents.

Figure 7:
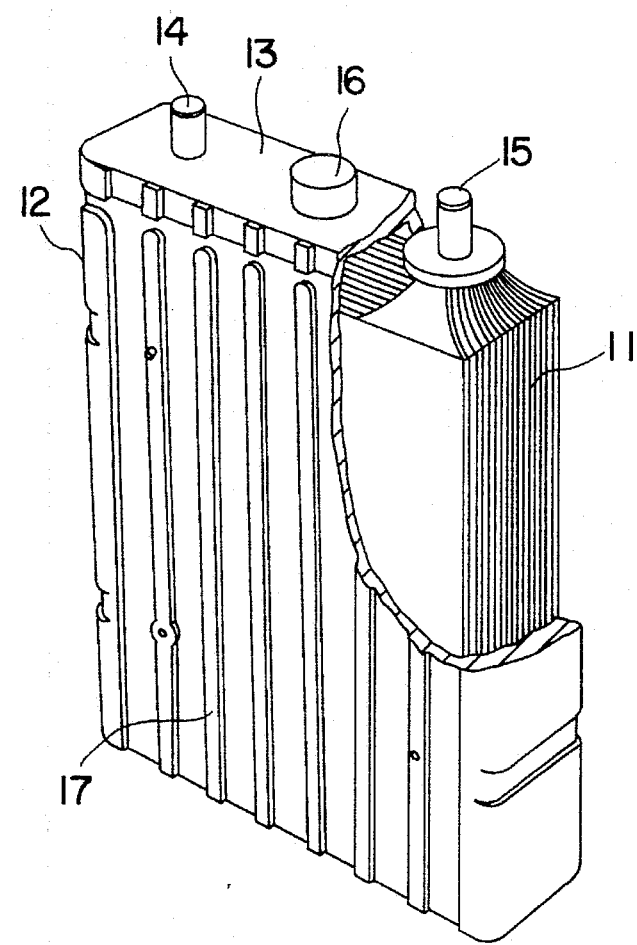
FIG. 7 is a perspective view of a sealed alkaline rechargeable battery equipped with the resealable safety vent with a portion of the outer case removed to show interior details thereof.

FIG. 7 shows a partially cutaway perspective view of the test cell of sealed alkaline rechargeable battery. In FIG. 7, a group of electrodes 11 was made up of ten 10 Ah positive plates which are highly porous formed nickel sheets filled with a paste made mainly of active nickel hydroxide power and eleven 13 Ah negative plates which are nickel plated preformed steel sheets roll pressed after both sides of the core material are coated with a hydrogen are storage alloy having a composition of Mm $Ni_{3.6}CO_0.7$ $Mn_{0.4}Al_{0.4}$ and a binder. Each sheet or plate is wrapped with a separator and stacked alternately. Overall thickness of the electrode group 11 is made to 85–100% of the internal length of battery container 12. Positive and negative lead plates of the electrode group 11 are welded to a nickel plated steel positive terminal 14 and negative terminal 15, respectively, and then housed in an ABS resin container 12. Then, 180 ml of alkaline electrolyte is poured into the container for impregnation into the electrode group 11. And then, an ABS resin cover 13 on which a resealable safety vent has been hermetically fusion bonded is fastened to the battery container 12 by adhesive, and the positive terminal 14 and negative terminal 15 are hermetically fixed to the container cover 13 to complete a sealed alkaline rechargeable battery. The outer surface of the battery container 12 is provided with a number of ribs 17 for reinforcing to add mechanical strength to the container and providing spaces between the cells for heat dissipation.

Test cells (A) and (B) equipped, respectively, with the resealable safety vent in accordance with the present invention and the comparative sample vent, are initially charged with 10A constant current for 15h and then discharged at a 20A constant current to 1.0 V to make the electrode group 11 swollen and firmly held by the inner wall of battery container 12.

The cycle life test is conducted at room temperature, by repeating a cycle of charging for 12h at a 10A constant current, 1h rest, and then discharging at a 20A constant current to 1.0 V and about 1h rest. As described earlier, during discharging in the cycle life test the sample cells are vibrated. The test results are shown in FIG. 8.

Figure 8:
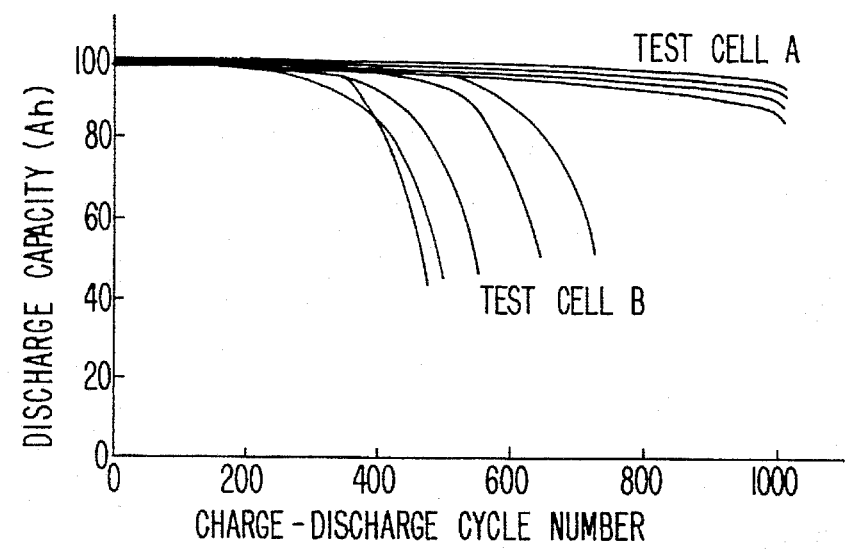
FIG. 8 is a plot of the charge-discharge cycle number against the discharge capacity.

FIG. 8 shows that all of the 5 (A) test cells equipped with resealable safety vent in accordance with the present invention have more than 80% of the nominal capacity after undergoing charge-discharge for 1000 cycles, whereas the (B) comparative test cells, the safety vent body and the safety vent cover of which are fixed by being screwed together, show a cycle life spread of 400–720 cycles until decreasing down to 80 Ah which corresponds to 80% of the nominal capacity. Among the (B) test cells, it is observed that the screw connection between the safety vent body and safety vent cover was found to be loose resulting in a decreased valve operating pressure which caused escape of oxygen and hydrogen gas generated during charging thus decreasing electrolyte quantity, and hence a decreased cell weight. All of these cells have increased internal resistance, which seems to cause insufficient charging and deteriorated discharge capacity.

As each of the foregoing Examples indicates, unitizing the safety vent body and the safety vent cover by means of bonding or fusion bonding instead of fixing by a conventional threaded connection is one of the important points of the present invention. Although the Examples are described with the ultrasonic fusion bonding method, a thermally molten bonding method and bonding with adhesives are also applicable. These methods of making a unitary structure are usable commonly for fabricating the safety vent body and the cover of a battery container and for making the battery container and the cover of the battery container into a unitary structure. To make full use of the advantage of this method it is advisable to select and use the same plastic material for the battery container, the container cover, the safety vent body and the safety vent cover. Besides ABS resin as set forth in the foregoing Examples, the plastic material may be selected from the group of such alkali resisting plastic materials as polyamide resin, PP resin(polypropylene), AS resin(acrylonitrile-styrene copolymer), denatured resin mainly composed of polyphenylene ether, and others.

Figure 2:
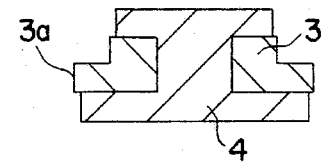
FIG. 2 is a longitudinal sectional view of a one-piece valve component for a resealable safety vent in accordance with the present invention.
Figure 3:
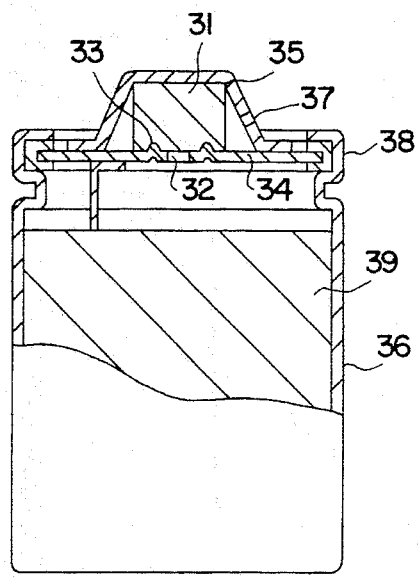
FIG. 3 is a longitudinal view partially in section of a prior art small size sealed alkaline rechargeable battery using a steel cell container.
Figure 4:
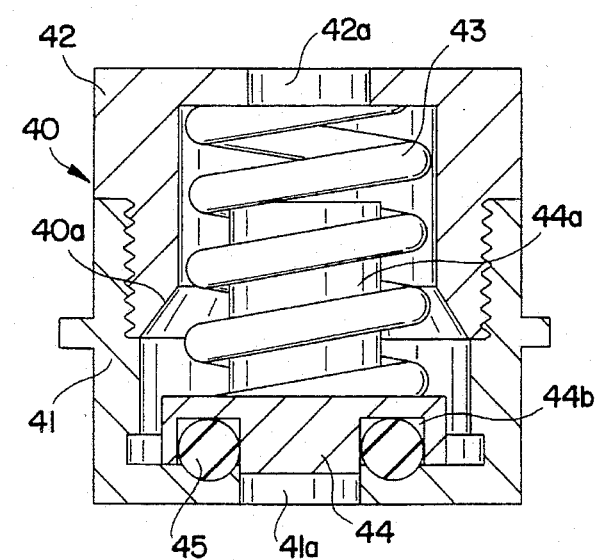
FIG. 4 is a longitudinal sectional view of an example of a prior art resealable safety vent for a sealed alkaline rechargeable battery having a plastic cell container.

As for the rubber pad, it may be selected from the group of such alkali resisting low hydrogen permeability synthetic rubbers as chloroprene rubber (polychlorobutadiene), nitrile rubber(acrylonitrile-butadiene copolymer), in addition to EPT rubber as set forth in the foregoing Examples. The valve component which is made of the valve seat and the rubber pad bonded to form a one-piece component may be manufactured as homogeneous quality components for production by setting the valve seat 3 having flange 3a as illustrated in FIG. 2 made of alkali resistive metal like stainless steel in a metal mold to be injection-molded with a thermoplastic synthetic rubber material, and then by applying heat sulfation after having been shaped as one-piece component.

Although description of the foregoing examples is made solely with reference to the nickel metal hydride system, the present invention is applicable to any and all of the sealed alkaline rechargeable batteries whether they are of a nickel-cadmium system, nickel-zinc system, or silver-zinc system.

As has been explained in detail in the foregoing descriptions, the present invention makes it possible by quite a simple method to achieve a highly reliable plastic container sealed alkaline rechargeable battery, the resealable safety vent of which maintains a specified operating pressure stabilized for a long period of time even when the battery is used under adverse conditions such as vibration, shock, acceleration, etc. which caused substantial problems in prior art batteries.

What is claimed:

1. A sealed alkaline rechargeable battery equipped with a resealable safety vent comprising:

a safety vent body having a passage at the center of a bottom portion of said body, an end of said passage terminating in said body surrounded by a circular protrusion, and a safety vent cover having a vent hole fastened to said safety valve body by means of bonding to form a unitary structure with a central internal passage, and an elastic valve component comprising a valve seat and a rubber pad fabricated into a one-piece unit, said valve component having a top part and a flange part, said top part inserted inside a coil spring disposed in said central internal passage so that the top surface of said flange part of said valve component compresses said coil spring inside said central internal passage; wherein a bottom surface of said elastic valve component is held against said protrusion inside of said safety vent body and closes said passage in said safety vent body; and wherein a container cover in which said safety vent, is incorporated as a monobloc, or a container cover in which said safety vent is bonded or fusion bonded to become a part of the container cover, is fastened around a top edge of a container by means of bonding or fusion bonding, said safety vent incorporated into said access cover to communicate with and vent gas from inside said container, said container housing an electrode group consisting of at least one positive plate, negative plate and separator and an appropriate quantity of alkaline electrolyte for impregnation of the electrode, said safety vent is hermetically sealed with the container along the latter's top edge by means of bonding or fusion bonding.

2. A sealed alkaline rechargeable battery in accordance with claim 1, wherein inside of the safety vent body has a cylindrical shape, horizontal cross sections of the safety vent cover, the valve seat and the rubber pad are round, and the safety vent body, the safety vent cover, the valve component consisting of the valve seat and the rubber pad, and the coil spring are stacked vertically with their center lines on a same axis line.

3. A sealed alkaline rechargeable battery in accordance with claim 1, wherein the material of the safety vent body and the safety vent cover is at least a one which is the same as the material of the battery container selected from the group of such alkali resistive plastic as polyamide, polypropylene, denatured resin mainly composed of polyphenylene ether, acrylonytrile-styrene copolymer, acrylonitrile-butadien-stylene terpolymer, etc.

4. A sealed alkaline rechargeable battery in accordance with claim 1, wherein height of the circular extrusion on the inner bottom surface of the safety vent body is within a range of 0.25–2.00 mm, and cross sectional shape of the circular extrusion at the top edge is semicircular.

5. A sealed alkaline rechargeable battery in accordance with claim 1, wherein the coil spring, made of a stainless steel or a nickel plated steel wire, has a free length 5–15 mm, and the spring constant falls within a range of 0.2–2.0 kgf/mm.

6. A sealed alkaline rechargeable battery in accordance with claim 1, wherein the diameter of flange part of the valve seat made of an alkali resistive plastic or metal is smaller than inside diameter of the safety vent body, and the flat bottom surface of said flange part of valve seat is provided with a rubber pad bonded or fusion bonded to compose a one-piece component, which rubber pad has a diameter equal to or smaller than that of the flange diameter, and thickness of 0.5–1.5 mm, and the Shore hardness falls within a range 50°–100°.

7. A sealed alkaline rechargeable battery in accordance with claim 1, wherein the material of rubber pad is at least one selected from the group of such alkali resistive synthetic rubber having low hydrogen permeability as nitrile rubber (acrylonitrile-butadiene co-polymer), chloroprene rubber (poly chlorobutadiene), ethylene-propylene-diene terpolymer rubber, etc.

8. A sealed alkaline rechargeable battery, wherein a plurality of electrode groups made of positive plates and negative plates with separators in between are housed in a container, and an appropriate quantity of alkaline electrolyte is poured to have said electrode groups impregnated, and a container cover equipped with a resealable safety vent comprising a safety vent body having a passage at the center of a bottom portion of said body, an end of said passage terminating in said body surrounded by a circular protrusion, and a safety vent cover having a vent hole fastened to said safety vent body by means of bonding to form a unitary structure with a central internal passage, and an elastic valve component comprising a valve seat and a rubber pad fabricated into a one-piece unit, said valve component having a top part and a flange part, said top part inserted inside a coil spring disposed in said central internal passage so that the top surface of said flange part of said valve component compresses said coil spring inside said central internal passage; wherein a bottom surface of said elastic valve component is held against said protrusion inside of said safety vent body and closes said passage in said vent body; and said safety vent is hermetically sealed with the container along the latter's top edge by means of bonding or fusion bonding.

9. A sealed alkaline rechargeable battery in accordance with claim 8, wherein inside of the safety vent body has a cylindrical shape, horizontal cross sections of the safety vent cover, the valve seat and the rubber pad are round, and the safety vent body, the safety valve cover, the valve component consisting of the valve seat and the rubber pad, and the coil spring are stacked vertically with their center lines on a same axis line.

10. A sealed alkaline rechargeable battery in accordance with claim 8, wherein the material of the safety vent body and the safety vent cover is at least one which is the same as the material of the battery container selected from the group of such alkali resistive plastic as polyamide, polypropylene, denatured resin mainly composed of polyphenylene ether, acrylonytrile-stylene copolymer, acrylonitrile-butadien-stylene terpolymer, etc.

11. A sealed alkaline rechargeable battery in accordance with claim 8, wherein height of the circular extrusion on the inner bottom surface of the safety vent body is within a range of 0.25–2.00 mm, and cross sectional shape of the circular extrusion at the top edge is semicircular.

12. A sealed rechargeable alkaline battery in accordance with claim 8, wherein the coil spring, made of a stainless steel or a nickel plated steel wire, has a free length 5–15 mm, and the spring constant falls within a range of 0.2–2.0 kgf/mm.

13. A sealed rechargeable alkaline battery in accordance with claim 8, wherein the diameter of flange part of the valve seat made of an alkali resistive plastic or metal is smaller than inside diameter of the safety vent body, and the flat bottom surface of said flange part of valve seat is provided with a rubber pad bonded or fusion bonded to compose a one-piece component, which rubber pad has a diameter equal to or smaller than that of the flange diameter, and thickness of 0.5–1.5 mm, and the Shore hardness falls within a range 50°–100°.

14. A sealed rechargeable alkaline battery in accordance with claim 8, wherein the material of the rubber pad is at least one selected from the group of such alkali resistive synthetic rubber having low hydrogen permeability as nitrile rubber (acrylonitrile-butadiene co-polymer), chloroprene rubber (poly chlorobutadiene), ethylene-propylene-diene terpolymer rubber, etc.

* * * * *

UNITED STATES PATENT AND TRADEMARK OFFICE
CERTIFICATE OF CORRECTION

PATENT NO. : 5,554,455
DATED : September 10, 1996
INVENTOR(S) : Hiroshi Inoue et al.

It is certified that error appears in the above-indentified patent and that said Letters Patent is hereby corrected as shown below:

On cover page, item [57] Abstract, first line, before "safety" insert -- resealable safety vent comprising a --.

Signed and Sealed this

Twenty-fifth Day of February, 1997

Attest:

BRUCE LEHMAN

*Attesting Officer*         *Commissioner of Patents and Trademarks*